United States Patent
Huang et al.

(10) Patent No.: US 8,928,567 B2
(45) Date of Patent: *Jan. 6, 2015

(54) SWITCHABLE VIEWING ANGLE DISPLAY

(75) Inventors: Jiandong Huang, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 911 days.

This patent is subject to a terminal disclaimer.

(21) Appl. No.: 13/104,896

(22) Filed: May 10, 2011

(65) Prior Publication Data

US 2012/0050342 A1     Mar. 1, 2012

Related U.S. Application Data

(63) Continuation-in-part of application No. 12/877,017, filed on Sep. 7, 2010, now abandoned, which is a continuation-in-part of application No. 12/873,188, filed on Aug. 31, 2010, now abandoned.

(51) Int. Cl.
     *G09G 3/36*       (2006.01)
     *G09G 3/34*       (2006.01)
     *G02F 1/13*       (2006.01)

(52) U.S. Cl.
     CPC ............ *G09G 3/342* (2013.01); *G02F 1/1323* (2013.01); *G09G 3/36* (2013.01); *G09G 2320/0626* (2013.01); *G09G 2320/068* (2013.01)
     USPC .............................. 345/87; 349/33; 349/136

(58) Field of Classification Search
None
See application file for complete search history.

(56) References Cited

U.S. PATENT DOCUMENTS

| | | | |
|---|---|---|---|
| 2003/0072080 A1* | 4/2003 | Ariyoshi et al. | 359/487 |
| 2004/0061934 A1* | 4/2004 | Lee et al. | 359/443 |
| 2006/0132423 A1* | 6/2006 | Travis | 345/102 |
| 2009/0067156 A1* | 3/2009 | Bonnett et al. | 362/97.2 |
| 2009/0219734 A1* | 9/2009 | Sawada et al. | 362/616 |

FOREIGN PATENT DOCUMENTS

| | | |
|---|---|---|
| JP | 2008009061 | 1/2008 |
| JP | 2009301 041 | 12/2009 |
| JP | 2010039942 | 2/2010 |
| JP | 2010277901 | 12/2010 |

OTHER PUBLICATIONS

Takatoh, K, et al., "New Peeping Prevention Technology to Control Viewing Angle Properties of TFT-LCDs", SID Digest, 2006, pp. 1340-1343.

* cited by examiner

*Primary Examiner* — Seokyun Moon
(74) *Attorney, Agent, or Firm* — Law Office of Gerald Maliszewski; Gerald Maliszewski

(57) ABSTRACT

A switchable viewing angle display method is provided, using arrayed microlenses and a waveguide pipe with selectable light extraction positions. The method provides a front panel array of display pixels. Also provided is an array of microlenses underlying the array of display pixels. Each microlens has a focal point and each microlens is associated with a corresponding block of display pixels. A backlight panel has an edge-coupled waveguide pipe with an optical input connected to a column of light emitting diodes (LEDs). The backlight panel includes an array extraction pixels, each extraction pixel underlying a corresponding microlens, and the backlight panel also includes a planar mirror underlying the waveguide pipe. In response to a display viewing angle change command, a waveguide pipe's light extraction position is selected, which is the distance between the extraction pixels and their corresponding microlenses, and the display viewing angle is changed.

11 Claims, 8 Drawing Sheets

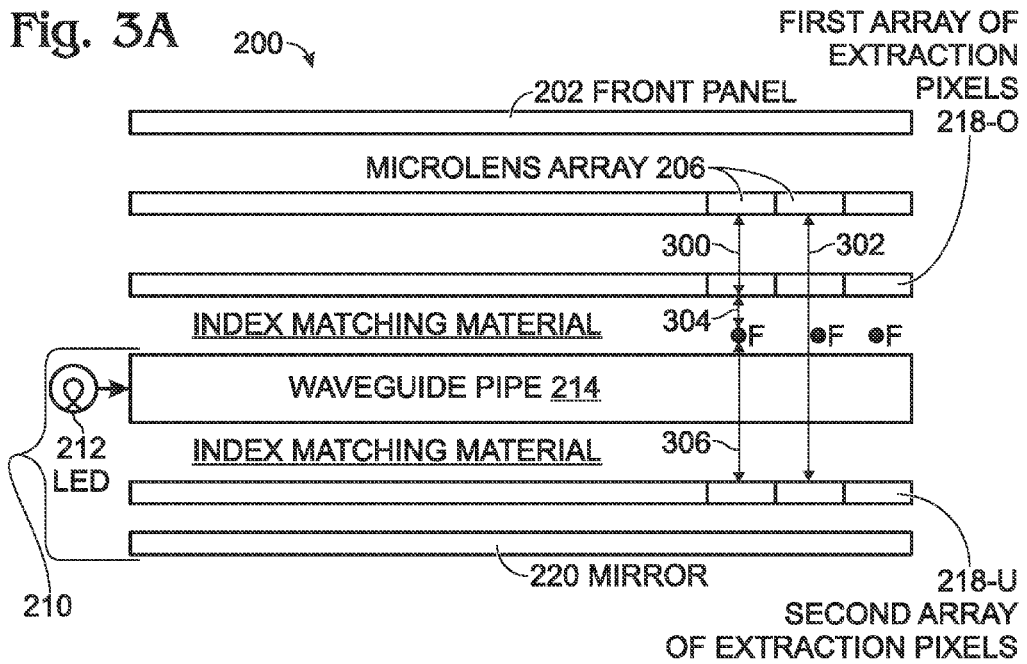
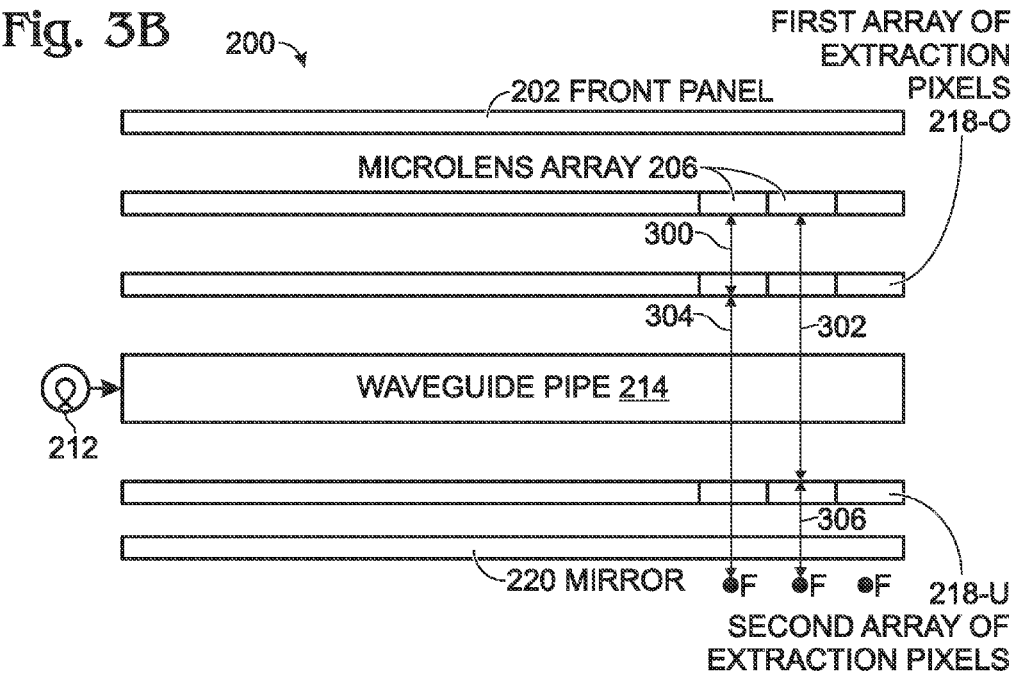

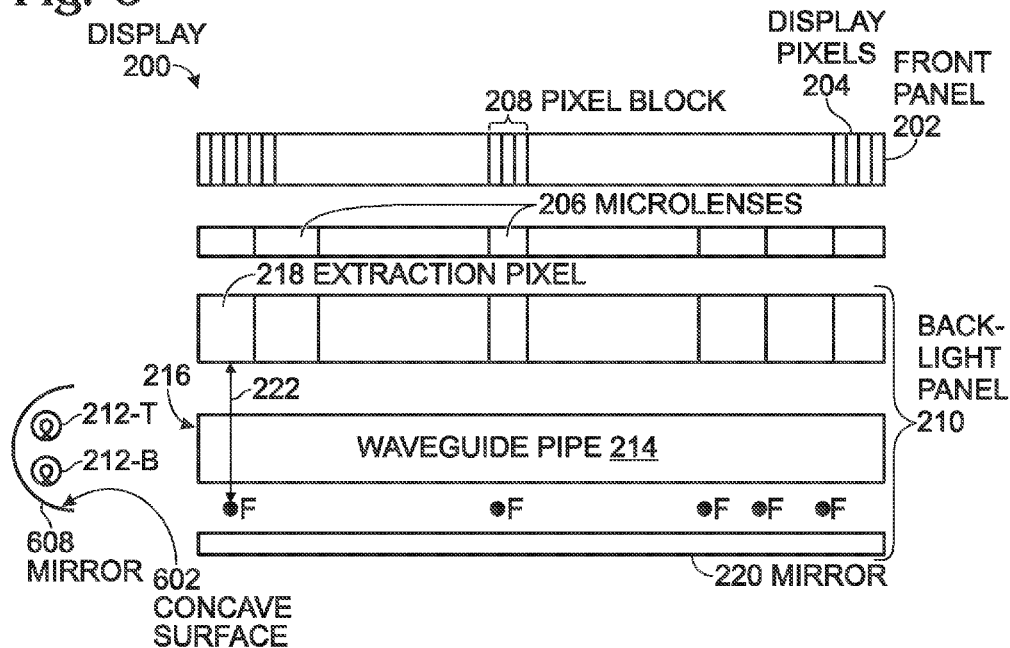
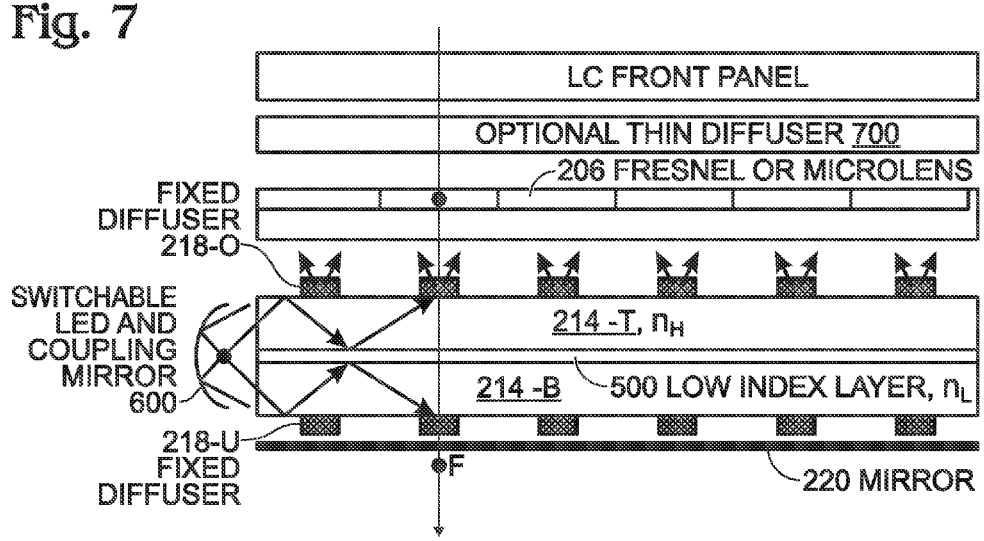

SWITCHABLE VIEWING ANGLE DISPLAY

RELATED APPLICATION

The application is a Continuation-in-Part of a application entitled, SCATTERING TUNABLE DISPLAY USING REFLECTIVE AND TRANSMISSIVE MODES OF ILLUMINATION, invented by Huang et al., Ser. No. 12/877,017, filed on Sep. 7, 2010 now abandoned, which is a Continuation-in-Part of a application entitled, THREE-DIMENSIONAL DISPLAY USING ANGULAR PROJECTION BACKLIGHT, invented by Huang et al., Ser. No. 12/873,188, filed on Aug. 31, 2010 now abandoned. Bother these applications are incorporated herein by reference.

BACKGROUND OF THE INVENTION

1. Field of the Invention

This invention generally relates to electronic displays and, more particularly, to a display capable of selectively operating in wide and narrow display ranges.

2. Description of the Related Art

Large panel liquid crystal (LC) displays normally require large viewing angles, and designs have been significantly improved to expand the viewing angles to near 180°. However, for portable display devices, more limited viewing angles are often desirable in the interest of privacy. To that end, 3M has developed passive films that can be used to cover displays, limiting the viewing angles to about 40°. For example, such a film can be used in airline seat displays to limit images that can be seen by neighboring passengers. However, these films degrade the image quality by placing extra film layers over the LC front panel, and such a display has a limited number of applications.

FIG. 1 is a diagram depicting a display with switchable viewing angles (prior art). One such device is presented by Takatoh et al., "New Peeping Prevention Technology to Control Viewing Angle Properties of TFT-LCDs", SID Digest, 2006, pp. 1340). When working in the narrow viewing angle mode, people outside the viewing angle can only see checked black and white blocks, thus protecting privacy. However, this method does not limit the backlight spreading angles, so that light emitted outside the narrow viewing angle is wasted, leading to poor display power efficiencies. The waste of energy is particularly critical for hand-held devices with battery supplied power.

It would be advantageous if a display device viewing angle could be switched by controlling the angle at which the backlight panel of the display supplies light to the front panel.

SUMMARY OF THE INVENTION

Disclosed herein are a display and an illumination method that can switch between viewing angles by controlling the direction of the light supplied by the underlying backlight panel. At narrow viewing angle modes, the display can reduce the backlight intensities while maintaining the same luminance due to narrower angle distributions, which makes the batteries of display devices last longer.

Accordingly, a switchable viewing angle display method is provided, using arrayed microlenses and waveguide pipes with selectable light extraction positions. The method provides a liquid crystal (LC) front panel array of display pixels arranged in a plurality of sequences. Also provided is an array of microlenses underlying the array of display pixels, where each microlens has a focal point and each microlens is associated with a corresponding block of display pixels. A backlight panel has an edge-coupled waveguide pipe with an optical input connected to a column of light emitting diodes (LEDs). The backlight panel includes an array extraction pixels formed in a plurality of sequences, each extraction pixel underlying a corresponding microlens, and the backlight panel also includes a planar mirror underlying the waveguide pipe. A command is accepted. In response to accepting a display viewing angle change command, a waveguide pipe's light extraction position is selected, which is the distance between the extraction pixels and their corresponding microlenses, and the display viewing angle is changed.

In one aspect, the array of extraction pixels includes a first array of extraction pixels underlying the array of microlenses and having a first light extraction position. A second array of extraction pixels overlies the planar mirror and has a second light extraction position, different than the first light extraction position. Selecting the waveguide pipe's light extraction position includes using either the first or second array of extraction pixels. In one aspect, a single waveguide pipe is used. Alternatively, the first and second arrays of extraction pixels are enabled through the use of different waveguide pipe layers.

Additional details of the above-described method, and a switchable viewing angle display using arrayed microlenses and a waveguide pipe with selectable light extraction positions, are presented below.

BRIEF DESCRIPTION OF THE DRAWINGS

FIGS. 3A and 3B are partial cross-sectional views of a variation of the display of FIG. 2, while

FIG. 6 is a partial cross-sectional view of another variation of the display of FIG. 2.

FIG. 7 is an alternate depiction of a display utilizing top and bottom layers of waveguide pipe and a concave mirror.

DETAILED DESCRIPTION

Figure 1:
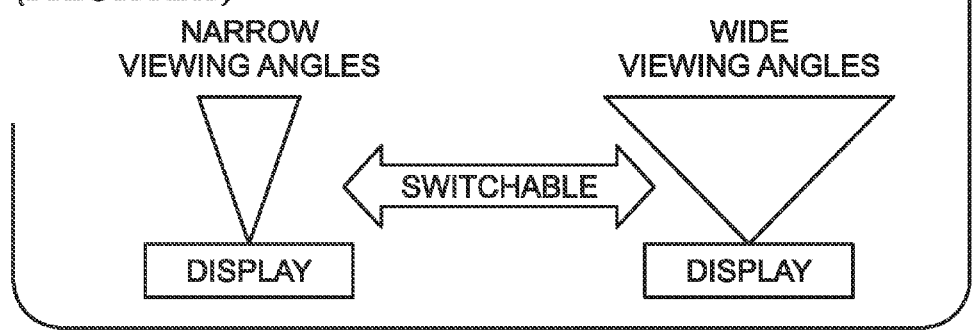
FIG. 1 is a diagram depicting a display with switchable viewing angles (prior art).
Figure 2:
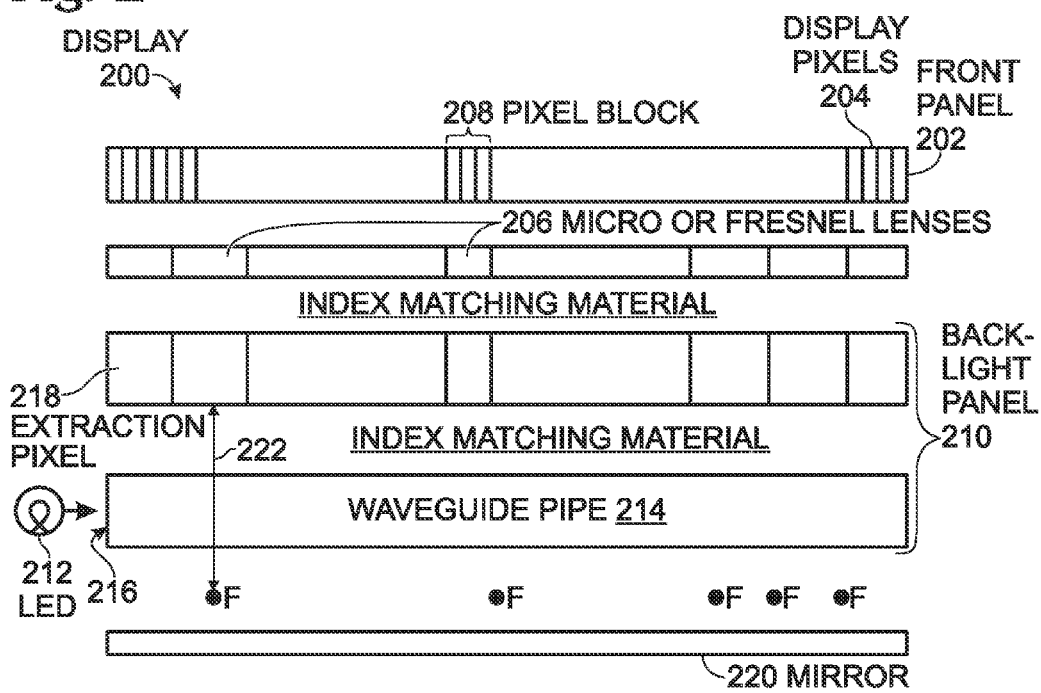
FIG. 2 is a schematic block diagram partial cross-sectional view depicting a switchable viewing angle display using arrayed microlenses and a waveguide pipe with selectable light extraction positions.

FIG. 2 is a schematic block diagram partial cross-sectional view depicting a switchable viewing angle display using arrayed microlenses and a waveguide pipe with selectable light extraction positions. The display 200 comprises a liquid crystal (LC) front panel 202 with an array of display pixels 204 arranged in a plurality of sequences. The display has application to any kind of display pixel requiring a backlight. In cross-section only a single sequence of display pixels 204 can be seen. An array of microlenses 206 underlies the array of display pixels 204, where each microlens 206 has a focal point (F) and each microlens 206 is associated with a corresponding block 208 of display pixel 204.

The backlight panel 210 includes a column of light emitting diodes (LEDs) 212. In cross-section only a single LED can be seen. An edge-coupled waveguide pipe 214 has an optical input 216 connected to the column of LEDs 212. An array of extraction pixels 218 is arranged in a plurality of sequences, each extraction pixel 218 underlies corresponding microlens 206. A planar mirror 220 underlies the waveguide pipe 214. A viewing angle selection switch (not shown) has a wide angle and a narrow angle setting. The switch can be a dedicated button. Alternatively, the viewing angle settings can be activated using a sequence of key strokes on an associated keypad (not shown), or prompted from a display viewing application. The waveguide pipe's light extraction position is the distance 222 between the extraction pixels 218 and their corresponding microlenses 206, and it changes in response to changing the viewing angle selection switch setting in one aspect, the distance 222 is changed by changing the separation between the front panel and backlight panel, or by changing the position of the extraction pixels with the backlight panel, Note: as shown more detail below, the extraction pixels may alternatively be arranged under the waveguide pipe, or both above and below the waveguide pipe.

Figure 3C:
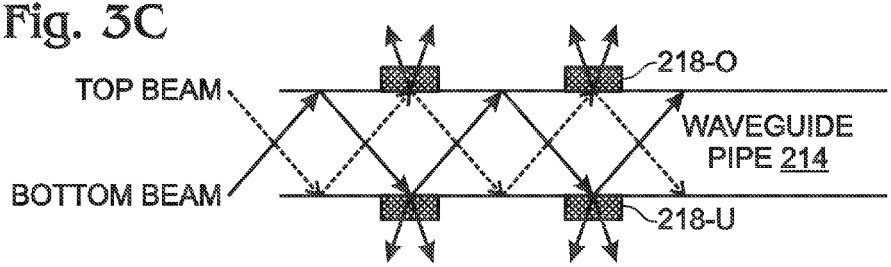
FIG. 3C depicts top and bottom beams of light propagating through the waveguide pipe by reflection.

FIGS. 3A and 3B are partial cross-sectional views of a variation of the display of FIG. 2, while FIG. 3C depicts top and bottom beams of light propagating through the waveguide pipe by reflection. In this aspect the array of extraction pixels includes a first array of extraction pixels 218-O underlying the array of microlenses 206, and having a first light extraction position 300. A second array of extraction pixels 218-U overlies the mirror 220, and has a second light extraction position 302, different than the first light extraction position 300. The viewing angle selection switch changes the viewing angle by switching between the first array of extraction pixels 218-O and the second array of extraction pixels 218-U.

Each microlens has a focal point (F). In this aspect, the extraction pixels 218-O in the first array of extraction pixels each have a first light extraction position that is a first distance 304 from the focal point (F) of a corresponding microlens 206. Likewise, the extraction pixels 218-U in the second array of extraction pixels each have a second light extraction position 302 that is a second distance 306 from the focal point (F) of a corresponding microlens 206. The second distance 306 is different than the first distance 304. In FIG. 3A the second distance 306 is greater than the first distance 304. In FIG. 3B the second distance 306 is less than the first distance 304.

For example, two highly collimated beams are used, with a top beam steered onto the first extraction top pixel array and a bottom beam steered onto the second extraction pixel array. There is a fixed interval between two consecutive extraction pixels that permit the top beam to propagate down the waveguide pipe by intersecting the first array extraction pixels and reflecting off the (smooth) bottom surface of the waveguide pipe between second array extraction pixels. Likewise, the bottom beam propagates down the waveguide pipe by intersecting the second array extraction pixels and reflecting off the (smooth) top surface of the waveguide pipe between first array extraction pixels.

Figure 4:
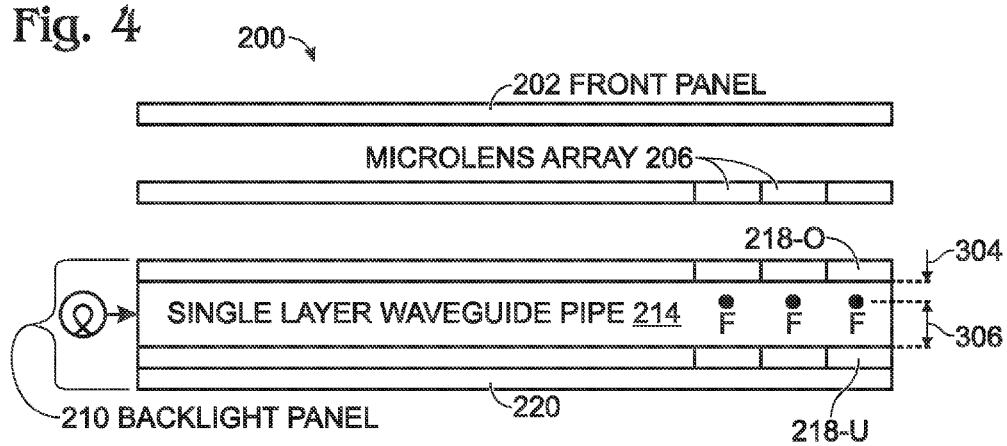
FIG. 4 is a partial cross-sectional view of a first variation of the display of FIG. 3A.

FIG. 4 is a partial cross-sectional view of a first variation of the display of FIG. 3A. In this aspect the backlight panel 210 includes a single layer of waveguide pipe 214. The first array of extraction pixels 218-O overlies the single layer of waveguide pipe 214. The second array of extraction pixels 218-U underlies the single layer of waveguide pipe 214. The second distance 306 is greater than the first distance 304. The viewing angle selection switch selects the narrow viewing angle, where light is distributed through each microlens 206 in a first range of angles, by engaging the first array of extraction pixels 218-O. The viewing angle selection switch selects the wide viewing angle, where light is distributed through each microlens 206 in a second range of angles greater than the first range of angles, by engaging the second array of extraction pixels 218-U.

Figure 5:
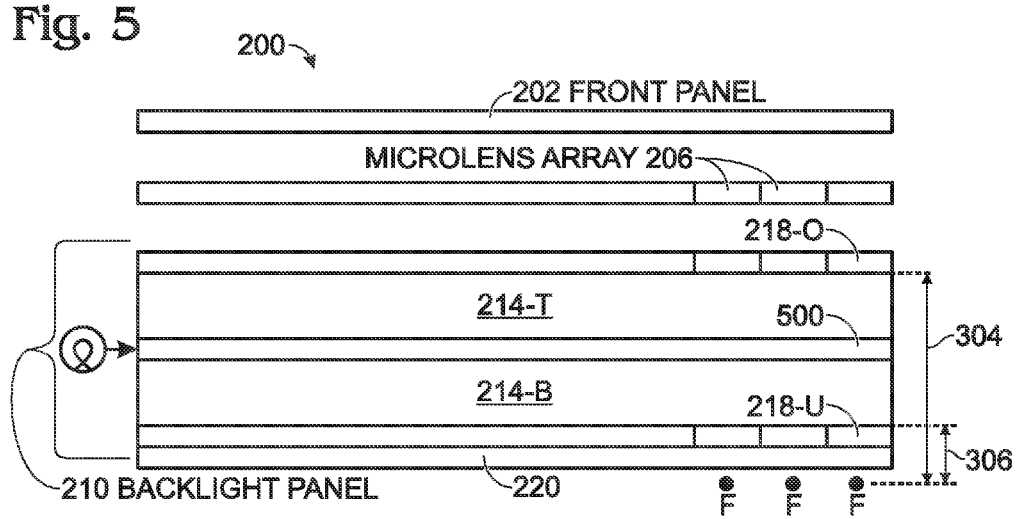
FIG. 5 is a partial cross-sectional view of a first variation of the display of FIG. 3B.

FIG. 5 is a partial cross-sectional view of a first variation of the display of FIG. 3B, in this aspect the waveguide pipe 214 includes a selectable top layer of waveguide pipe 214-T underlying the first array of extraction pixels 218-O, and a selectable bottom layer of waveguide pipe 214-B underlying the top layer of waveguide pipe 214-O and overlying the second array of extraction pixels 218-U. The backlight panel 210 includes a transparent layer 500 interposed, between the top layer waveguide pipe 214-T and the bottom layer waveguide pipe 214-B, having a lower index of refraction than the top and bottom layers of waveguide pipe. The viewing angle selection switch engages the first array of extraction pixels 218-O by selecting the top layer of waveguide pipe 214-T, and engages the second array of extraction pixels 218-U by selecting the bottom layer of waveguide pipe 214-B.

Alternatively stated, the first array of extraction pixels first distance 304 is greater than the second array of extraction pixels second distance 306, and the viewing angle selection switch selects the narrow viewing angle, where light is distributed through each microlens in the first range of angles, by selecting the bottom layer of waveguide pipe 214-B. The viewing angle selection switch selects the wide viewing angle, where light is distributed through each microlens in the second range of angles greater than the first range of angles, by selecting the top layer of waveguide pipe 214-T.

In this aspect, the extraction pixels can be fixed diffusion materials that permits incident light to escape from the waveguide pipe by scattering light into angles beyond the total internal reflection angles of waveguides. The fixed diffusion materials can be materials with optical index fluctuations or they can be a waveguide surface with micrometer scale surface roughness.

FIG. 6 is a partial cross-sectional view of another variation of the display of FIG. 2. In this aspect the backlight panel 210 includes a mirror 600 with a concave surface 602 (e.g., a parabolic cylindrical mirror) facing the optical input 216 of the waveguide pipe 214. The waveguide pipe can be either a single layer, or may be comprised of top and bottom layers. In this aspect, the column of LEDs 212 includes a column of top LEDs 212-T interposed between the mirror concave surface 602 and the waveguide pipe optical input 216. A column of selectable bottom LEDs 212-B is interposed between the mirror concave surface 602 and the waveguide pipe optical input 216, underlying the column of top LEDs 212-T. The viewing angle selection switch selects the first array of extraction pixels 218-O by engaging the column of bottom LEDs 212-B, and selects the second array of extraction pixels 218-U by engaging the column of top LEDs 212-T.

Functional Description

FIG. 7 is an alternate depiction of a display utilizing top and bottom layers of waveguide pipe and a concave mirror. A Fresnel or microlens (with focal points at F) film 206 is placed between a thin diffuser (optional) 700 and the backlight waveguide pipe layers 214-T and 214-B. The waveguide light pipe (optical index $n_H$) is divided into top and bottom layers by a layer of low index ($n_L$, if air $n_L$=1.0) material 500 and both surfaces of the waveguide layers are covered at selected areas (aligned to the micro lens axis) with well-designed micro-structures 218 for light extraction.

Figure 8A:
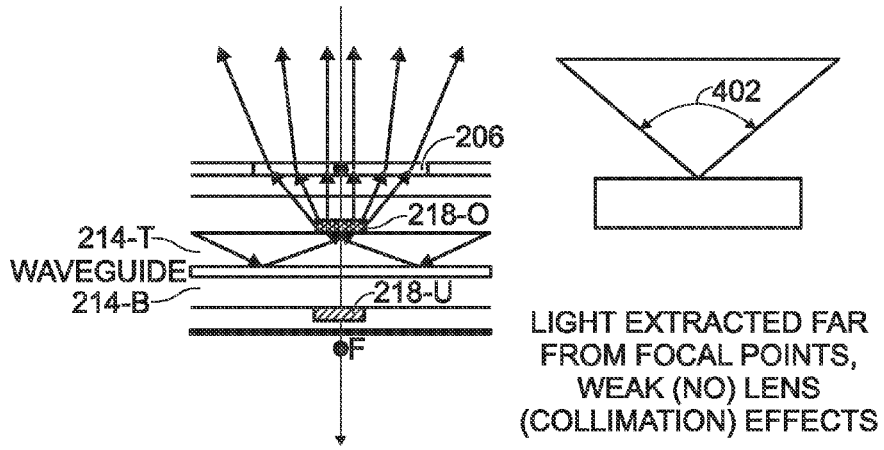
FIGS. 8A and 8B are cross-sectional views depicting, respectively, the selection of the top and bottom layers of waveguide pipe.
Figure 8B:
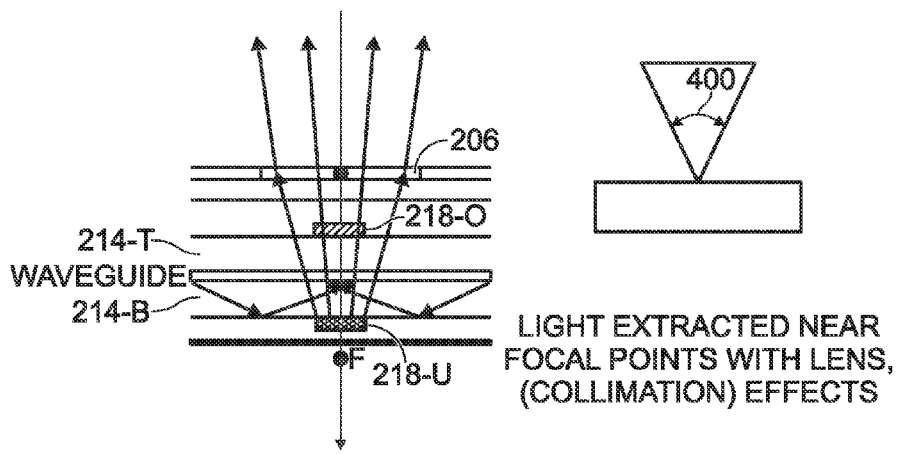
Figure 10A:
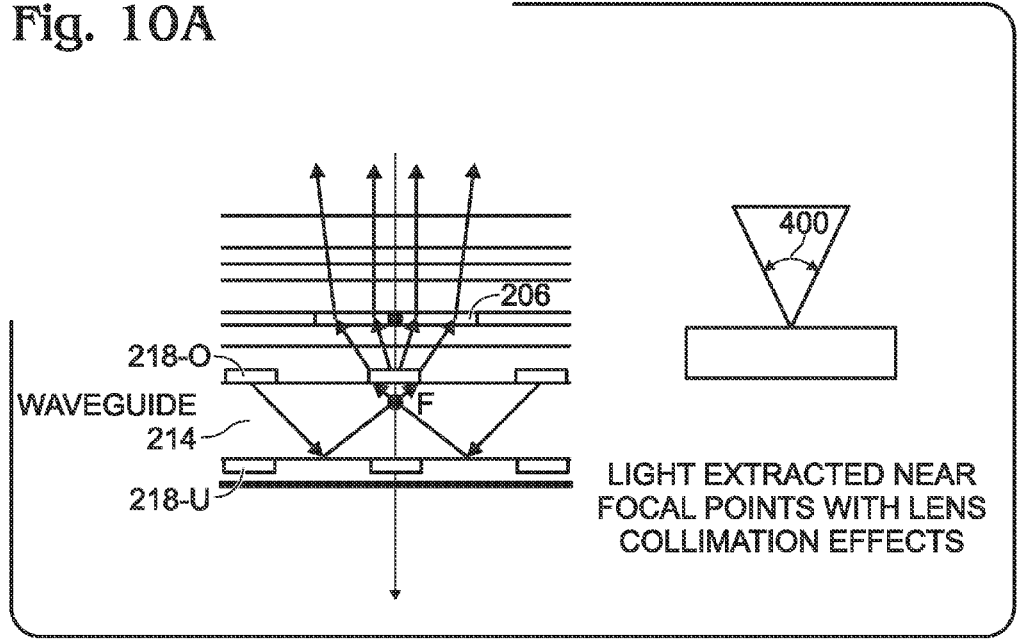
FIGS. 10A and 10B are cross-sectional views depicting, respectively, the selection of the top and bottom extraction pixels arrays.
Figure 10B:
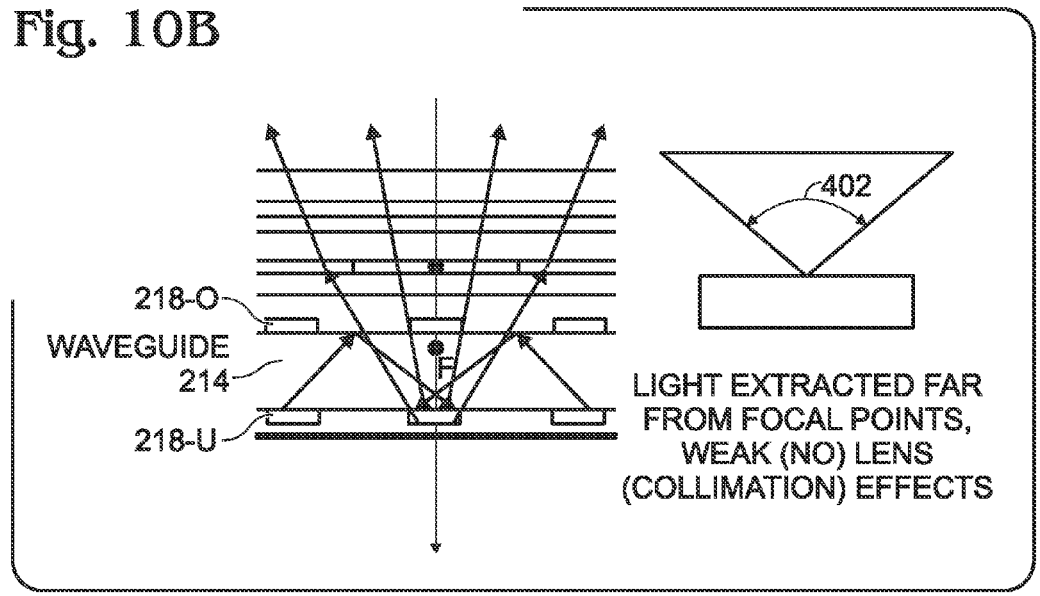

FIGS. 8A and 8B are cross-sectional views depicting, respectively, the selection of the top and bottom layers of waveguide pipe. With careful design, the focal points of the micro (Fresnel) lenses 206 can be near either the waveguide pipe bottom surface, as shown in FIGS. 8A and 8B, or near the waveguide pipe top surface, as shown in FIGS. 10A and 10B, it is difficult to place the microlens' focal paint on the waveguide pipe surfaces due to optical tolerances. As seen in FIG. 8A, light extraction occurs in top layer of the waveguide by directing LED light into the top layer of waveguide. Since the extraction pixel is far away from the focal point, light experiences less lens (focusing) effects and exits with large exiting angles for large viewing angles. In FIG. 8B the narrow viewing angle mode can be realized by switching light into the bottom layer of the waveguide light pipe with the extraction pixels 218-U near the focal points.

Figure 9:
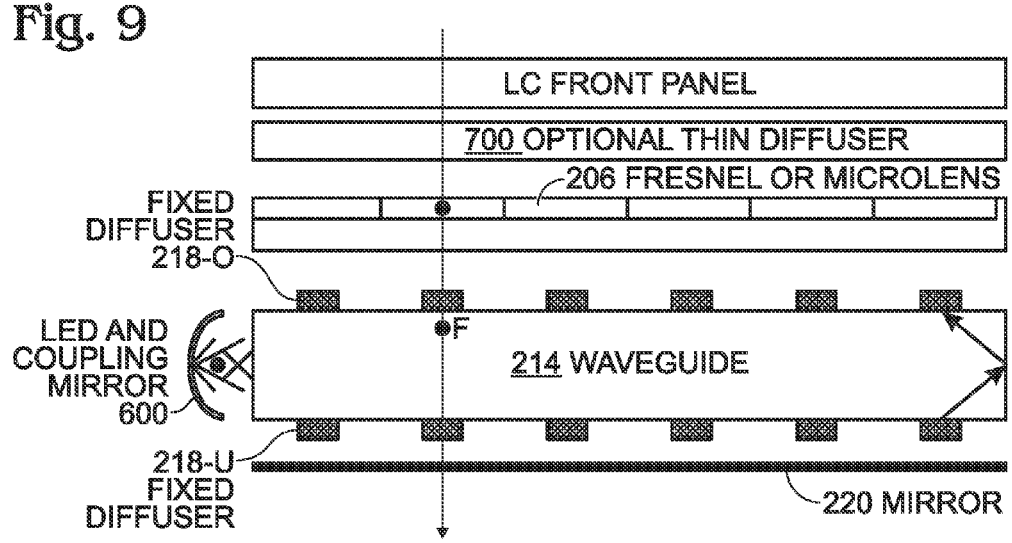
FIG. 9 is an alternate depiction of a display utilizing a single layer of waveguide pipe and a concave mirror.

FIG. 9 is an alternate depiction of a display utilizing a single layer of waveguide pipe and a concave mirror.

FIGS. 10A and 10B are cross-sectional views depicting, respectively, the selection of the top and bottom extraction pixels arrays. Comparing FIGS. 8A/8B with 10A/10B, focal points near the top surfaces of the waveguide pipe permit light to be collected more efficiently and reduce leakage in the narrow viewing mode.

Figure 11:
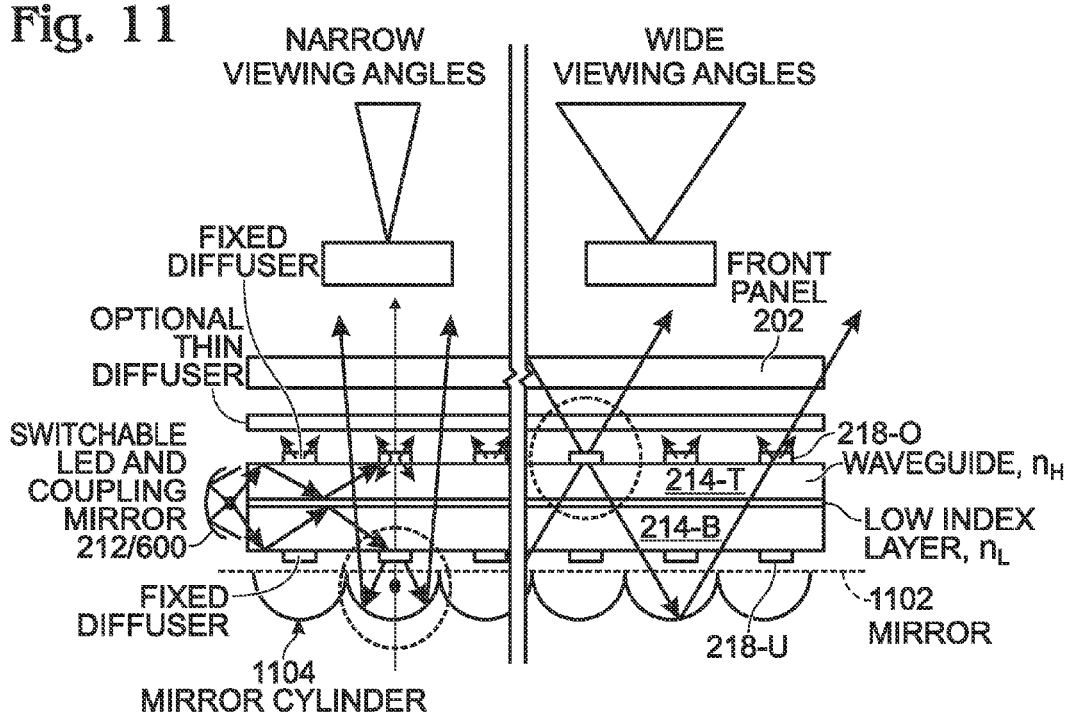
FIG. 11 is a partial cross-sectional view of a switchable viewing angle display using a waveguide pipe with selectable light extraction positions and a cylindrical array mirror.

FIG. 11 is a partial cross-sectional view of a switchable viewing angle display using a waveguide pipe with selectable light extraction positions and a cylindrical array mirror. The display 1100 comprises an LC front panel 202 array of display pixels arranged in a plurality of sequences. A backlight panel includes a column of LEDs 212 and an edge-coupled waveguide pipe having an optical input connected to the column of LEDs. The waveguide pipe having a top layer 214-T and bottom layer 214E. As shown, a concave mirror 600 is used. However, the display may be enabled without such a mirror. A first array of extraction pixels 218-O is arranged in a plurality of sequences overlying the top layer waveguide pipe 214-T. A second array of extraction pixels 218-U is arranged in a plurality of sequences underlying the bottom layer waveguide pipe 214-B. A cylindrical array mirror 1102 underlies the second array of extraction pixels, where each cylinder 1104 in the mirror 1104 underlies a corresponding extraction pixel from the second array of extraction pixels. As shown on the right-hand side of the figure, the cylindrical array mirror 1102 provides reflected light at a first (wide) viewing angle in response to selecting the top layer of waveguide pipe 214-T and the first layer of extraction pixels 218-O. As shown on the left-hand side of the figure, the cylindrical array mirror 1102 provides reflected light at a second (narrow) viewing angle, narrower than the first viewing angle, in response to selecting the bottom layer of waveguide pipe 214-B and the second layer of extraction pixels 218-U.

Figure 12:
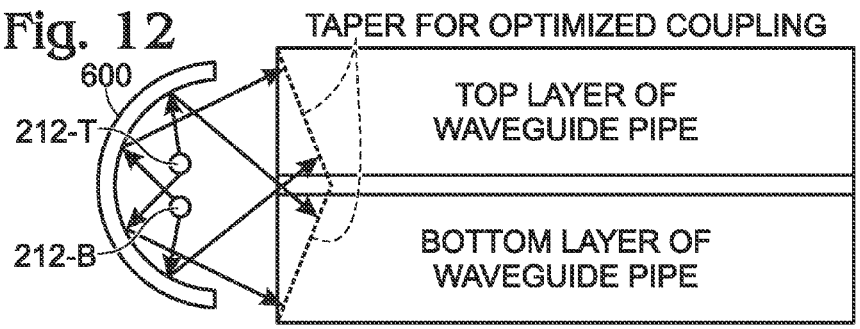
FIG. 12 is a more detailed depiction of the LED-coupled a concave mirror of FIG. 6.

FIG. 12 is a more detailed depiction of the LED-coupled concave mirror of FIG. 6. Combined with the use of top and bottom columns of LEDs, the design permits light to be steered into either the top or bottom layer (or both) of the waveguide pipe.

Figure 13:
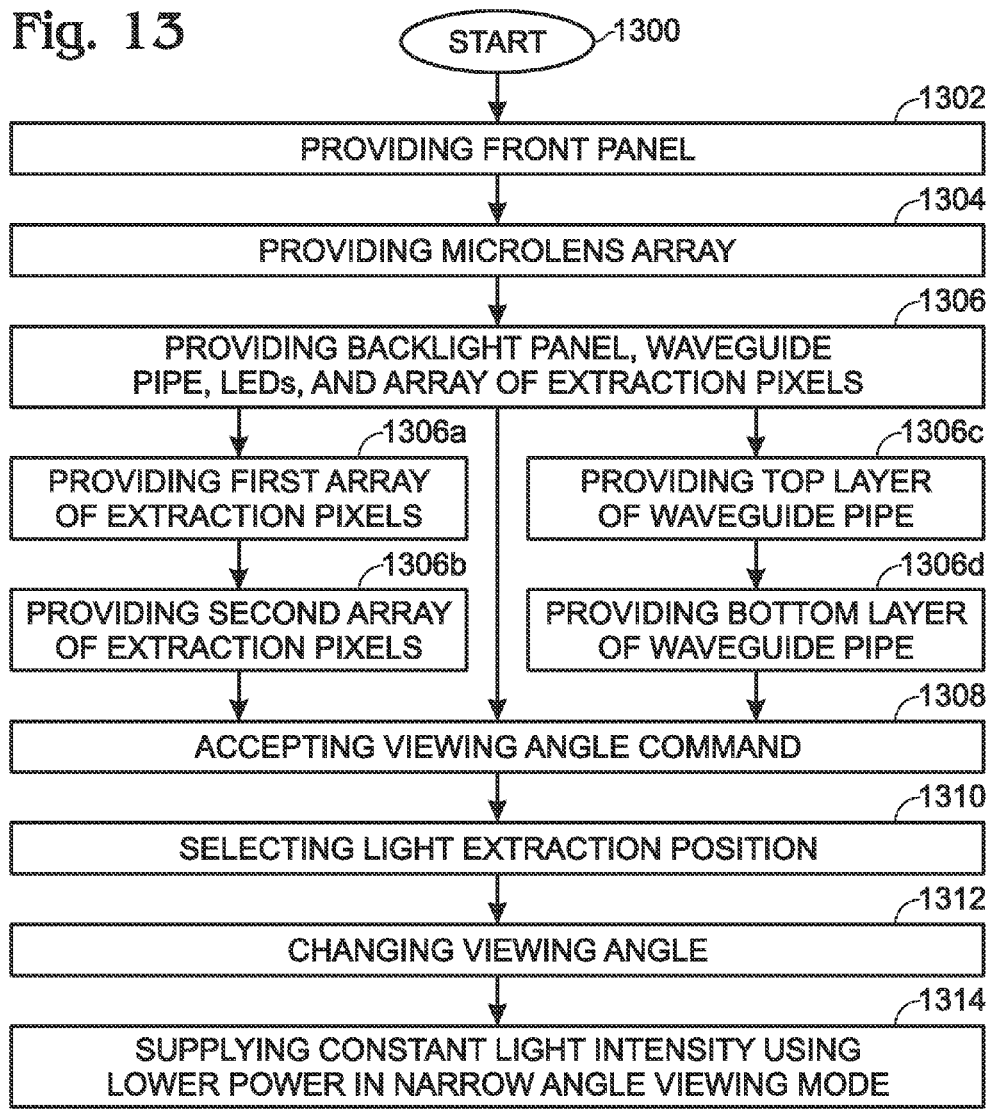
FIG. 13 is a flowchart illustrating a switchable viewing angle display method, using arrayed microlenses and waveguide pipes with selectable light extraction positions.

FIG. 13 is a flowchart illustrating a switchable viewing angle display method, using arrayed microlenses and waveguide pipes with selectable light extraction positions. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1300.

Step 1302 provides a liquid crystal (LC) front panel array of display pixels arranged in a plurality of sequences. Step 1304 provides an array of microlenses underlying the array of display pixels, where each microlens has a focal point and each microlens is associated with a corresponding block of display pixels. Step 1306 provides a backlight panel with an edge-coupled waveguide pipe having an optical input connected to a column of LEDs. The backlight panel includes an array extraction pixels formed in a plurality of sequences, each extraction pixel underlying a corresponding microlens. The backlight panel also includes a planar mirror underlying the waveguide pipe. Step 1308 accepts a display viewing angle change command. In response to the change command, Step 1310 selects a waveguide pipe's light extraction position, which is the distance between the extraction pixels and their corresponding microlenses. Step 1312 changes the display viewing angle. Step 1314 supplies a constant level of viewed light intensity, regardless of the selected viewing angle, maintained by a first level of supply power using the wide viewing angle. In Step 1314 a second level of supply power, less than the first level, is used when the narrow viewing angle is selected.

In one aspect, Step 1306 includes substeps. Step 1306a provides a first array of extraction pixels underlying the array of microlenses and having a first light extraction position. Step 1306b provides a second array of extraction pixels overlying the mirror and having a second light extraction position, different than the first light extraction position. Then, selecting the waveguide pipe's light extraction position includes in Step 1310 includes selecting either the first array of extraction pixels or the second array of extraction pixels.

In another aspect, Step 1304 provides the first array of microlenses, with each microlens having a focal point. Then, Step 1306a provides a first array of light extraction pixels, each with a first light extraction position being a first distance from the focal point of a corresponding microlens. Step 1306b provides a second array of light extraction pixels, each with a second light extraction position being a second distance from the focal point of a corresponding microlens, where the second distance is different than the first distance.

In one variation, Step 1306 provides a single layer of waveguide pipe, with the first array of extraction pixels overlying the single layer of waveguide pipe, and the second array of extraction pixels underlying the single layer of waveguide pipe in this variation, the second distance is greater than the first distance. When Step 1308 accepts a narrow viewing angle, where light is distributed through each microlens in a first range of angles, then Step 1310 selects the waveguide pipe's light extraction position by engaging the first array of extraction pixels. When Step 1308 accepts a wide viewing angle, where light is distributed, through each microlens in a second range of angles greater than the first range of angles, Step 1310 selects the waveguide pipe's light extraction position by engaging the second array of extraction pixels.

In a different variation, Step 1306 includes the following substeps. Step 1306c provides a selectable top layer of waveguide pipe underlying the first array of extraction pixels. Step 1306d provides a selectable bottom layer of waveguide pipe underlying the top layer of waveguide pipe and overlying the second array of extraction pixels. Step 1306 further provides a transparent layer interposed between the top and bottom layers of waveguide pipe, having a lower index of refraction than the top and bottom layers of waveguide pipe. Then, selecting the first array of extraction pixels in Step 1310 includes selecting the top layer of waveguide pipe. Otherwise, Step 1310 selects the second array of extraction pixels by selecting the bottom layer of waveguide pipe.

In this aspect, Step 1306 provides first and second arrays of extraction pixels where the first distance is greater than the second distance. If Step 1308 accepts a narrow viewing angle, where light is distributed through each microlens in a first range of angles, Step 1310 selects the bottom layer of waveguide pipe. If Step 1308 accepts the wide viewing angle, where light is distributed through each microlens in a second range of angles greater than the first range of angles, then Step 1310 selects the top layer of waveguide pipe.

In another aspect, Step 1306 provides a with concave surface facing the optical input of the waveguide pipe, and also provides a column of selectable top LEDs interposed between the mirror concave surface and the waveguide pipe optical input. Step 1306 further provides a column of selectable bottom LEDs interposed between the mirror concave surface and the waveguide pipe optical input, underlying the column of top LEDs. Then, selecting the first array of extraction pixels in Step 1310 includes selecting the column of bottom LEDs. Selecting the second array of extraction pixels in Step 1310 includes selecting the column of top LEDs.

A selective viewing angle display has been provided. Examples of particular materials and dimensions have been given to illustrate the invention, but the invention is not limited to just these examples. Other variations and embodiments of the invention will occur to those skilled in the art.

We claim:

1. A switchable viewing angle display method, using arrayed microlenses and a waveguide pipe with selectable light extraction positions, the method comprising:
   providing a liquid crystal (LC) front panel array of display pixels arranged in a plurality of sequences;
   providing an array of microlenses underlying the array of display pixels, where each microlens has a focal point and each microlens is associated with a corresponding block of display pixels;
   providing a backlight panel with a single layer of edge-coupled waveguide pipes having optical inputs connected to a column of light emitting diodes (LEDs), the backlight panel including a first array of extraction pixels underlying the array of microlenses disposed at a first light extraction position, which is at a first distance from a focal point of the array of microlens, a second array of extraction pixels overlying a planar mirror disposed at a second light extraction position, which is at a second distance from the focal point of the array of microlens, wherein the first distance is less than the second distance, and the backlight panel including the planar mirror underlying the waveguide pipe;
   accepting a display viewing angle change command; and,
   in response to the change command, selecting a waveguide pipe's light extraction position, using, an array of extraction pixels selected from a group consisting of the first array of extraction pixels and the second array of extraction pixels; and,
   changing the display viewing angle.

2. The method of claim 1
   wherein providing the first array of extraction pixels includes providing the first array of extraction pixels overlying the single layer of waveguide pipe; and,
   wherein providing the second array of extraction pixels includes providing the second array of extraction pixels underlying the single layer of waveguide pipe.

3. The method of claim 2 wherein accepting the viewing angle change command includes accepting a narrow viewing angle, where light is distributed through each microlens in a first range of angles; and,
   wherein selecting the waveguide pipe's light extraction position includes engaging the first array of extraction pixels.

4. The method of claim 3 wherein accepting the viewing angle change command includes accepting a wide viewing angle, where light is distributed through each microlens in a second range of angles greater than the first range of angles;
   wherein selecting the waveguide pipe's light extraction position includes engaging the second array of extraction pixels.

5. The method of claim 1 wherein providing the backlight panel includes providing a mirror with a concave surface facing the optical input of the waveguide pipe;
   wherein providing the column of LEDs includes:
      providing a column of selectable top LEDs interposed between the mirror concave surface and the waveguide pipe optical input;
      providing a column of selectable bottom LEDs interposed between the mirror concave surface and the waveguide pipe optical input, underlying the column of top LEDs;
   wherein selecting the first array of extraction pixels includes selecting the column of bottom LEDs; and.
   wherein selecting the second array of extraction pixels includes selecting the column of top LEDs.

6. The method of claim 1 further comprising:
   supplying a constant level of viewed light intensity, regardless of the selected viewing angle, maintained by a first level of supply power corresponding to the wide viewing angle, and a second level of supply power, less than the first level, corresponding to the narrow viewing angle.

7. A switchable viewing angle display using arrayed microlenses and a waveguide pipe with selectable light extraction positions, the display comprising:
   a liquid crystal (LC) front panel array of display pixels arranged in a plurality of sequences;
   an array of microlenses underlying the array of display pixels, where each microlens has a focal point and each microlens is associated with a corresponding block of display pixels;
   a backlight panel including:
      a column of light emitting diodes (LEDs);
      a single layer of edge-coupled waveguide pipes having optical inputs connected to the column of LEDs;
      a first array of extraction pixels underlying the array of microlenses, each light extraction pixel in the first array having a first light extraction position, which is at a first distance from a focal point of the array of microlens;
      a second array of extraction pixels overlying a planar mirror, each light extraction pixel in the second array having a second light extraction position, which is at a second distance from the focal point of the array of microlenses, wherein the first distance is less than the second distance; and the planar mirror underlying the waveguide pipe; and a viewing angle selection switch having a wide angle and a narrow angle setting for selecting between the first array of extraction pixels and the second array of extraction pixels.

8. The display of claim 7
wherein the first array of extraction pixels overlies the single layer of waveguide pipe; and,
wherein the second array of extraction pixels underlies the single layer of waveguide pipe.

9. The display of claim 8 wherein the viewing angle selection switch selects the narrow viewing angle, where light is distributed through each microlens in a first range of angles, by engaging the first array of extraction pixels.

10. The display of claim 9 wherein the viewing angle selection switch selects the wide viewing angle, where light is distributed through each microlens in a second range of angles greater than the first range of angles, by engaging the second array of extraction pixels.

11. The display of claim 7 wherein the backlight panel includes a mirror with a concave surface facing the optical input of the waveguide pipe;
wherein the column of LEDs includes:
a column of top LEDs interposed between the mirror concave surface and the waveguide pipe optical input;
a column of selectable bottom LEDs interposed between the mirror concave surface and the waveguide pipe optical input, underlying the column of top LEDs; and,
wherein the viewing angle selection switch selects the first array of extraction pixels by engaging the column of bottom LEDs, and selects the second array of extraction pixels by engaging the column of top LEDs.

* * * * *